US010435044B2

United States Patent
Sawa et al.

(10) Patent No.: US 10,435,044 B2
(45) Date of Patent: Oct. 8, 2019

(54) AIR SPRING AND BOGIE

(71) Applicants:Sumitomo Electric Industries, Ltd., Osaka-shi, Osaka (JP); KAWASAKI JUKOGYO KABUSHIKI KAISHA, Kobe-shi, Hyogo (JP)

(72) Inventors: Takayuki Sawa, Osaka (JP); Hideki Kitada, Osaka (JP); Yasuhiko Ura, Osaka (JP); Takehiro Nishimura, Kobe (JP); Keiichiro Kamura, Kobe (JP); Yoshi Sato, Sanda (JP)

(73) Assignees: SUMITOMO ELECTRIC INDUSTRIES, LTD., Osaka-shi, Osaka (JP); KAWASAKI JUKOGYO KABUSHIKI KAISHA, Kobe-shi, Hyogo (JP)

( * ) Notice: Subject to any disclaimer, the term of this patent is extended or adjusted under 35 U.S.C. 154(b) by 239 days.

(21) Appl. No.: 15/526,396

(22) PCT Filed: Oct. 17, 2016

(86) PCT No.: PCT/JP2016/080694
§ 371 (c)(1),
(2) Date: May 12, 2017

(87) PCT Pub. No.: WO2018/073860
PCT Pub. Date: Apr. 26, 2018

(65) Prior Publication Data
US 2018/0290669 A1    Oct. 11, 2018

(51) Int. Cl.
*B61F 5/10*    (2006.01)
*F16F 9/05*    (2006.01)

(52) U.S. Cl.
CPC ............... *B61F 5/10* (2013.01); *F16F 9/052* (2013.01)

(58) Field of Classification Search
CPC ..... B61F 5/10; F16F 9/05; F16F 9/052; F16F 9/44
See application file for complete search history.

(56) References Cited

U.S. PATENT DOCUMENTS

| 5,588,368 A | 12/1996 | Richter et al. |
| 6,257,561 B1 * | 7/2001 | Nakayama ............... F16F 9/05 267/122 |

(Continued)

FOREIGN PATENT DOCUMENTS

| JP | H09-89029 A | 3/1997 |
| JP | 2000-035075 A | 2/2000 |

(Continued)

*Primary Examiner* — Vishal R Sahni
(74) *Attorney, Agent, or Firm* — Drinker Biddle & Reath LLP (57) ABSTRACT

An air spring includes: an outer cylindrical member; an inner cylindrical member; a diaphragm which couples the outer and inner cylindrical members and forms an internal space; a stopper assembly disposed in the internal space; and a pivoting mechanism which causes this stopper assembly to pivot on the inner cylindrical member. The stopper assembly has a stopper portion protruding towards the outer cylindrical member, and the outer cylindrical member has as a set four or more protrusion portions provided at a position to face the stopper portion and protruding toward the inner cylindrical member. Each of the protrusion portions belonging to the set is disposed successively and also different in height. Each of the protrusion portions belonging to the set is arranged without having a protrusion portion belonging to the set smallest in height adjacent to a protrusion portion belonging to the set largest in height.

6 Claims, 8 Drawing Sheets

(56) References Cited

U.S. PATENT DOCUMENTS

| | | | |
|---|---|---|---|
| 2011/0233832 A1* | 9/2011 | Sawa | B61F 5/10 267/3 |
| 2013/0313764 A1 | 11/2013 | Fujimoto et al. | |

FOREIGN PATENT DOCUMENTS

| JP | 2000-088030 A | 3/2000 |
|---|---|---|
| JP | 2012-17769 A | 1/2012 |
| JP | 2012-145135 A | 8/2012 |

\* cited by examiner

AIR SPRING AND BOGIE

TECHNICAL FIELD

The present invention relates to an air spring and a bogie.

BACKGROUND ART

Conventionally, an air spring which utilizes compressed air's elasticity has been known. An example of a conventional air spring is described for example in Japanese Patent Laying-Open No. 2000-035075. The air spring described in this document has a level adjustment mechanism for keeping compressive deformation (or stroke) substantially constant.

As another example of a conventional air spring, there is also an air spring described in Japanese Patent Laying-Open No. 2012-017769. The air spring described in this publication is a stopper equipped air spring comprising a descent regulating means. As a still another example of a conventional air spring, an air spring described in Japanese Patent Laying-Open No. 2012-145135 can be mentioned. This air spring is equipped with a stopper for limiting an amount of vertical displacement.

CITATION LIST

Patent Documents

[Patent document 1] Japanese Patent Laying-Open No. 2000-035075
[Patent document 2] Japanese Patent Laying-Open No. 2012-017769
[Patent document 3] Japanese Patent Laying-Open No. 2012-145135

SUMMARY OF INVENTION

An air spring of one aspect of the present invention comprises: an outer cylindrical member; an inner cylindrical member combined with this outer cylindrical member; and a diaphragm which couples the outer cylindrical member and the inner cylindrical member and forms an internal space between the outer cylindrical member and the inner cylindrical member. The present air spring comprises: a stopper assembly which is disposed in the internal space to be pivotable on the inner cylindrical member and can prevent the outer cylindrical member from moving toward the inner cylindrical member more than necessary; and a pivoting mechanism which causes this stopper assembly to pivot on the inner cylindrical member. The stopper assembly has a stopper portion protruding towards the outer cylindrical member, and the outer cylindrical member has as a set four or more protrusion portions provided at a position to face the stopper portion and protruding toward the inner cylindrical member, and each of the protrusion portions belonging to the set is disposed successively and also different in height and each of the protrusion portions belonging to the set is arranged without having a protrusion portion belonging to the set smallest in height adjacent to a protrusion portion belonging to the set largest in height.

DESCRIPTION OF EMBODIMENTS

Issue to be Addressed by the Present Disclosure

In the following, an air spring in an embodiment of the present invention will be described using FIG. 1 to FIG. 9 after an issue which an air spring described in patent document 1 (Japanese Patent Laying-Open No. 2000-035075) which is a representative conventional example encompasses is first described.

In this air spring, an outer cylindrical member (6) is provided with a plurality of surfaces to be supported (6a, 6b, 6c). As shown in FIG. 7 of patent document 1, a surface to be supported lowest in level (6a) is adjacent to a surface to be supported highest in level (6c). In this air spring, outer cylindrical member (6) may not only move toward an inner cylindrical member (2) but also horizontally move or rotate relative to inner cylindrical member (2). When a stopper's position is set such that surface to be supported lowest in level (6a) and a raised portion (8b) face each other, and outer cylindrical member (6) moves toward inner cylindrical member (2), surface to be supported highest in level (6c) may be located at a position lower in level than an upper surface of raised portion (8b). When outer cylindrical member (6) horizontally moves or rotates relative to inner cylindrical member (2) in that state, a side surface of raised portion (8b) and a side surface of surface to be supported highest in level (6c) may collide with each other.

Effect of Present Disclosure

An air spring of the present embodiment can solve such an issue of the air spring described in patent document 1. Furthermore, while the air spring of the present embodiment can be used in a variety of applications such as a suspension, a vibration isolator, and a vehicular height controller, When it is applied for example to a railway vehicle, it can be attached between the vehicle and a bogie unit (a chassis and a vehicular wheel) and alleviate vibration transmitted from the vehicular wheel to the vehicle.

The air spring of the present embodiment is an air spring of a self-sealing system and includes an outer cylindrical member, an inner cylindrical member combined with this outer cylindrical member, and a diaphragm which couples the outer cylindrical member and the inner cylindrical member and forms an internal space between the outer cylindrical member and the inner cylindrical member. The outer cylindrical member and the inner cylindrical member can be produced with a rigid material such as metal and fiber reinforced plastics. The diaphragm can be produced with an elastic material such as elastomer. The internal space is a sealed space and sealed with compressed air therein.

The air spring of the present embodiment also includes a stopper assembly which is disposed in the internal space to be pivotable on the inner cylindrical member and can prevent the outer cylindrical member from moving toward the inner cylindrical member more than necessary, and a pivoting mechanism which causes this stopper assembly to pivot on the inner cylindrical member. The stopper assembly may be drivable manually or by a driving force provided from a power source.

The stopper assembly of the air spring of the present embodiment has a stopper portion protruding towards the outer cylindrical member. The outer cylindrical member of the air spring of the present embodiment has as a set four or more protrusion portions provided at a position to face the stopper portion and protruding toward the inner cylindrical member, and each of the protrusion portions belonging to the set is disposed successively and also different in height and each of the protrusion portions belonging to the set is arranged without having a protrusion portion belonging to the set smallest in height adjacent to a protrusion portion belonging to the set largest in height.

DESCRIPTION OF EMBODIMENT OF THE PRESENT INVENTION

Initially, embodiments of the present invention will be enumerated and specifically described.

(1) An air spring according to one aspect of the present invention comprises an outer cylindrical member, an inner cylindrical member, a diaphragm, a stopper assembly, and a pivoting mechanism. The inner cylindrical member is combined with the outer cylindrical member. The diaphragm couples the outer cylindrical member and the inner cylindrical member and forms an internal space between the outer cylindrical member and the inner cylindrical member. The stopper assembly is disposed in the internal space to be pivotable on the inner cylindrical member and can prevent the outer cylindrical member from moving toward the inner cylindrical member more than necessary. The stopper assembly has a stopper portion protruding towards the outer cylindrical member. The outer cylindrical member has as a set four or more protrusion portions protruding toward the inner cylindrical member, and each of the protrusion portions belonging to the set is disposed successively and also different in height and each of the protrusion portions belonging to the set is arranged without having a protrusion portion belonging to the set smallest in height adjacent to a protrusion portion belonging to the set largest in height. This can suppress collision and hence damage of a side surface of the stopper portion and those of the protrusion portions.

(2) In the air spring according to item (1) above, the protrusion portions belonging to the set may be arranged such that the protrusion portion belonging to the set smallest in height is disposed between a protrusion portion belonging to the set second smallest in height and a protrusion portion belonging to the set third smallest in height. In that case, the protrusion portions belonging to the set have a protrusion portion smallest in height having a minimal difference in height from the protrusion portions adjacent thereto, which can further suppress collision and hence damage of the side surface of the stopper portion and those of the protrusion portions.

(3) In the air spring according to item (1) above, the protrusion portions belonging to the set may have disposed between the protrusion portion of the set smallest in height and the protrusion portion of the set largest in height the number of protrusion portions belonging to the set minus three. In that case, of the protrusion portions belonging to the set, the protrusion portion smallest in height and the protrusion portion largest in height have a maximal spacing therebetween, which can further suppress collision and hence damage of the side surface of the stopper portion and those of the protrusion portions.

(4) In the air spring according to item (1) above, a plurality of stopper portions may be included and the number of sets of protrusion portions may be equal to the number of stopper portions. This can coestablish reliably suppressing a movement of the outer cylindrical member toward the inner cylindrical member and preventing the stopper portion and the protrusion portions from easily colliding with each other.

(5) In the air spring according to items (1) to (4) above, the stopper portion may have a rubber layer and a metal layer and the rubber layer and the metal layer may be disposed alternately. This allows the stopper portion to be more rigid in a direction in which the stopper portion is compressed than a stopper portion composed of a rubber layer alone, and can more reliably suppress movement of the outer cylindrical member toward the inner cylindrical member.

(6) In the air spring according to item (5) above, on the upper surface of the stopper portion, an antifriction material may be formed. This allows smooth sliding between the stopper portion and the protrusion portions.

DETAILS OF EMBODIMENTS OF THE PRESENT INVENTION

Hereinafter, embodiments of the present invention will specifically be described.

First Embodiment

Figure 1:
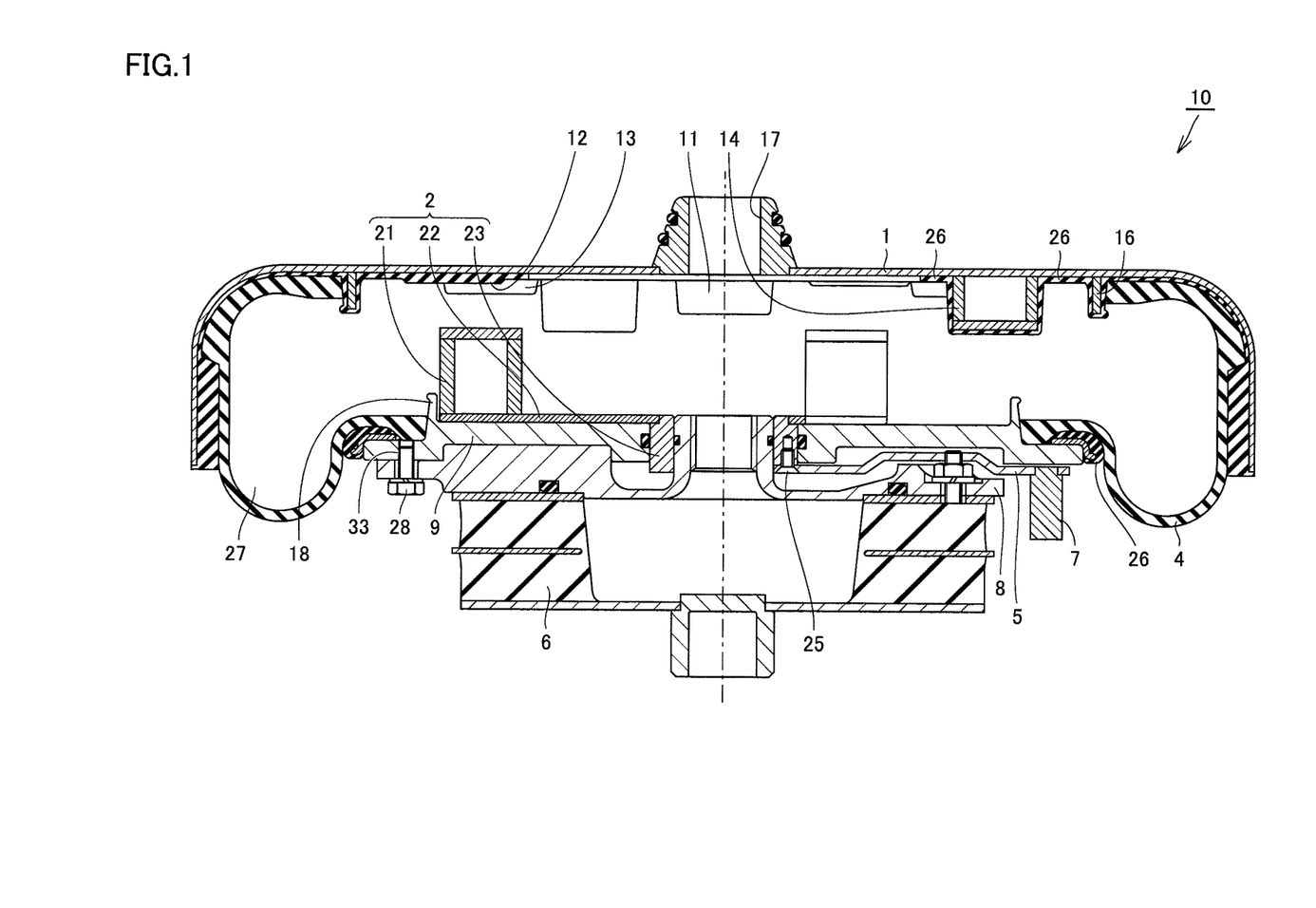
FIG. 1 is a cross section of an air spring in a first embodiment of the present invention.

An air spring in a first embodiment of the present invention is shown in FIG. 1. As shown in FIG. 1, an air spring 10 comprises an outer cylindrical member 1, an inner cylindrical member 9, and a diaphragm 4. Outer cylindrical member 1 comprises an upper plate, a plurality of protrusion portions 11-14 protruding from the upper plate (toward inner cylindrical member 9), and a ring-shaped projection portion 16 located outer than protrusion portions 12-14 and raised from the upper plate. The upper plate has a flat plate portion at a center portion thereof, and a side wall portion at a peripheral portion thereof. A hole portion is provided at the center portion of the flat plate portion of the upper plate, and a coupling portion 17 is attached to the hole portion. Protrusion portions 11-14 have a cylindrical shape, and as shown in FIG. 1, they have different heights, respectively. While in the example of FIG. 1 protrusion portions 11-14 are hollow, they may be solid.

As shown in FIG. 1, inner cylindrical member 9 includes a hole portion at a center portion thereof, a lower plate having an upper surface portion around the hole portion, a flange 18 raised from the lower plate, and a stopper assembly 2 disposed on the upper surface portion of the lower plate. Stopper assembly 2 has a plurality of cylindrical stopper portions 21, a base portion 22 on which stopper portions 21 are mounted, and a ring portion 23 attached to the hole portion of the center portion of the lower plate. Stopper portion 21 has a function which prevents outer cylindrical member 1 from moving toward inner cylindrical member 9 in a prescribed amount or larger.

As shown in FIG. 1, diaphragm 4 couples outer cylindrical member 1 and inner cylindrical member 9 and forms an internal space 27 between outer cylindrical member 1 and inner cylindrical member 9. A portion of diaphragm 4 on the side of its one end extends along the side wall portion and upper plate of outer cylindrical member 1, and one end of diaphragm 4 abuts against ring-shaped projection portion 16 of outer cylindrical member 1. The other end of diaphragm 4 is placed on a peripheral portion of inner cylindrical member 9 and abuts against flange 18 of inner cylindrical member 9. Thus, internal space 27 of air spring 10 can be a sealed space. A rubber sheet 26 is disposed between diaphragm 4 and a peripheral portion of inner cylindrical member 9.

A bottom plate 8 is disposed under inner cylindrical member 9. Bottom plate 8 has a cylindrical portion at a center portion thereof, and this cylindrical portion is attached inside ring portion 23 of stopper assembly 2. A screw hole 33 is provided through inner cylindrical member 9, and by screwing a bolt 28 through bottom plate 8 into screw hole 33, bottom plate 8 can be fixed to inner cylindrical member 9. A lever 5 is provided between inner cylindrical member 9 and bottom plate 8 for operating stopper assembly 2 pivotably. Lever 5 has one end fixed to ring portion 23 with a screw 25, and has the other end with a handle 7 attached to allow lever 5 to be manually operated pivotably. Laminated rubber 6 is disposed under bottom plate 8. Note that stopper assembly 2 is fixed to inner cylindrical member 9 or bottom plate 8 as appropriate in a state in which stopper portions 21 have pivoted to face protrusion portions 11-14.

Figure 2:
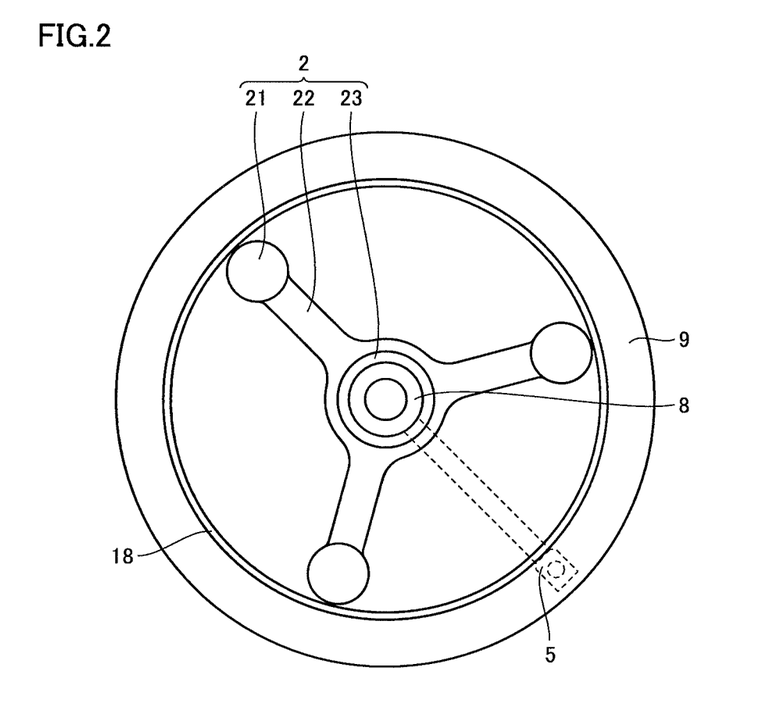
FIG. 2 is a plan view showing a stopper assembly and an inner cylindrical member shown in FIG. 1.

An example of an internal structure of inner cylindrical member 9 is shown in FIG. 2. As shown in FIG. 2, stopper assembly 2 comprises three base portions 22, and stopper portion 21 is fixed on an outer end of each base portion 22. Stopper portion 21 protrudes from base portion 22 toward outer cylindrical member 1. Base portions 22 are disposed at equal intervals. In the example of FIG. 2, base portions 22 are each spaced from another by 120 degrees. Furthermore, base portions 22 are equal in length.

By operating lever 5 to cause it to pivot, three base portions 22 simultaneously pivot and accordingly, three stopper portions 21 will also simultaneously pivot. At the time, three base portions 22 slide on the upper surface portion of the lower plate of inner cylindrical member 9.

Figure 3:
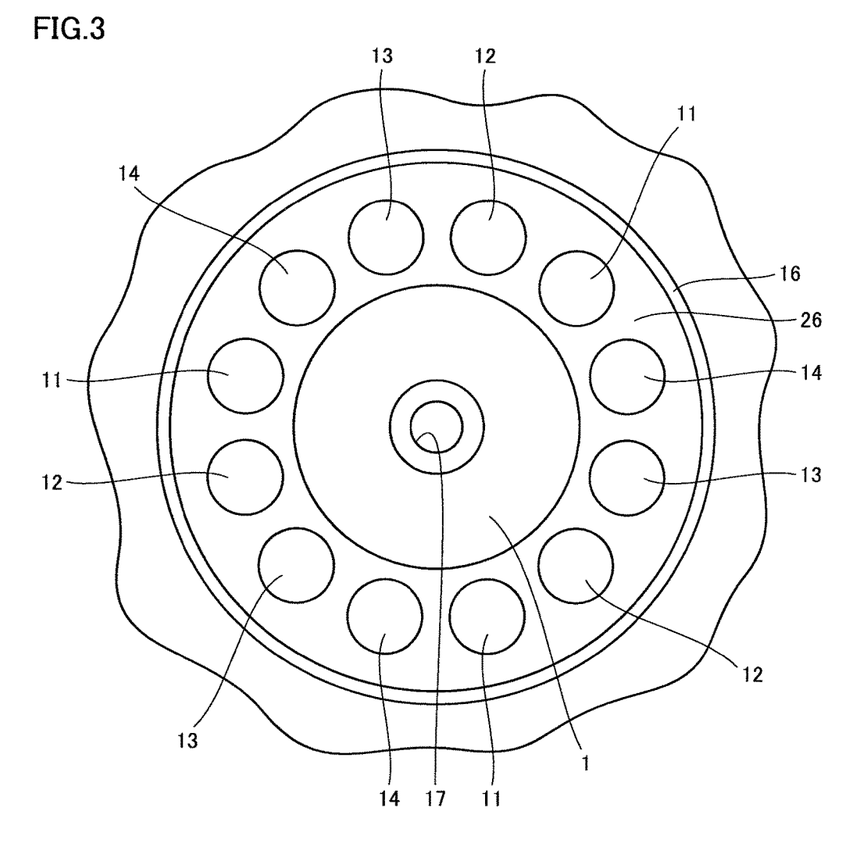
FIG. 3 is a partial plan view showing an internal structure of an outer cylindrical member shown in FIG. 1.
Figure 4:
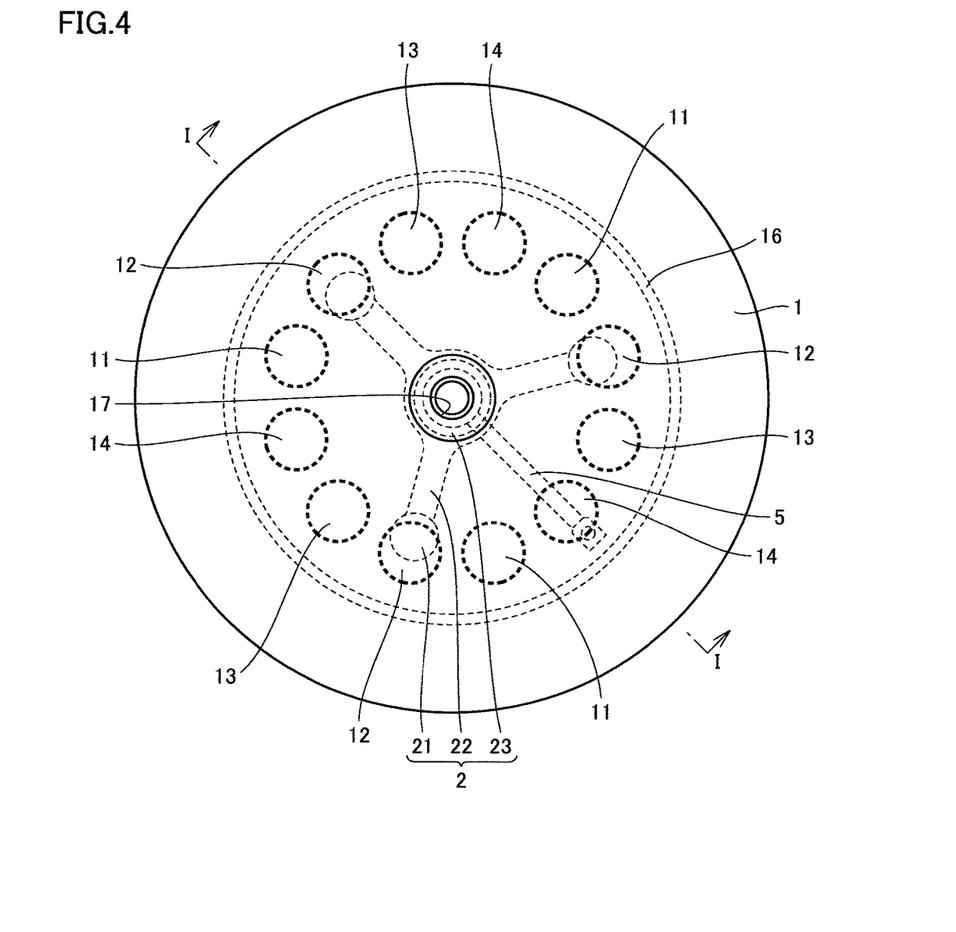
FIG. 4 is a plan view showing a positional relationship of the stopper assembly and a protrusion portion of the outer cylindrical member shown in FIG. 1.

An internal structure of outer cylindrical member 1 is shown in FIG. 3. As shown in FIG. 3, protrusion portions 11-14 having four types of heights are disposed at equal intervals. Protrusion portions 11-14 having four types of heights are disposed successively. Protrusion portions 11-14 having four types of heights are provided as a set. Four or more protrusion portions may belong to the set. Protrusion portions 11-14 of the set are disposed successively. More than one set may be provided. In the example of FIG. 3, three sets of protrusion portions 11-14 having different heights, respectively, are provided. More specifically, in the example of FIG. 3, the same number of sets of protrusion portions 11-14 as the number of stopper portions 21 is provided. And as shown in FIG. 4, three protrusion portions 12 having the same height are disposed at the positions corresponding to three stopper portions 21. Protrusion portions 11 and 13-14 are also disposed similarly. More specifically, each set has its protrusion portions in the same arrangement. Thereby, three stopper portions 21 can be caused to pivot to be disposed simultaneously at positions facing three protrusion portions 11 having the same height.

Figure 5:
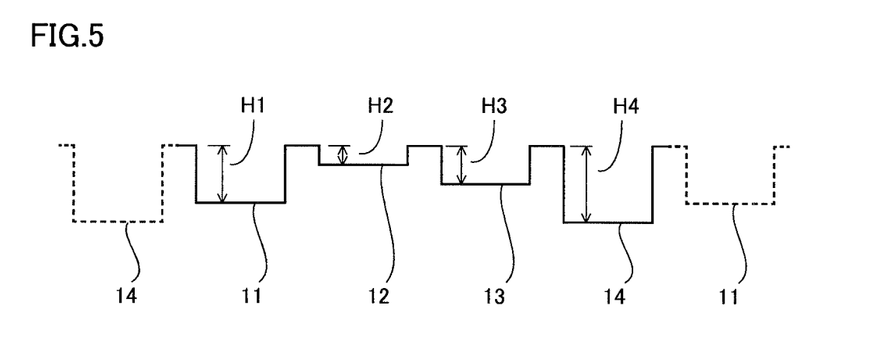
FIG. 5 illustrates a manner of arranging the protrusion portion in the first embodiment of the present invention.

An arrangement of protrusion portions 11-14 is schematically shown in FIG. 5. As shown in FIG. 5, protrusion portions 11-14 are arranged in an order as follows: protrusion portion 11 followed by protrusion portion 12 followed by protrusion portion 13 followed by protrusion portion 14. Note that protrusion portion 11 is adjacent to protrusion portion 14 belonging to an adjacent set and protrusion portion 14 is adjacent to protrusion portion 11 belonging to another adjacent set.

Protrusion portion 11 has a height H1. Protrusion portion 12 has a height H2. Protrusion portion 13 has a height H3. Protrusion portion 14 has a height H4. Heights H1-H4 of protrusion portions 11-14 satisfy a relationship of height H4>height H1>height H3>height H2. More specifically, protrusion portions 11-14 are arranged such that a protrusion portion largest in height (i.e., protrusion portion 14) is not adjacent to a protrusion portion smallest in height (i.e., protrusion portion 12). When this is represented from a different point of view, the protrusion portion smallest in height (i.e., protrusion portion 12) is disposed between protrusion portions other than the protrusion portion largest in height (i.e., protrusion portions 11 and 13). In other words, the protrusion portion smallest in height (i.e., protrusion portion 12) is disposed between a protrusion portion second smallest in height (i.e., protrusion portion 13) and a protrusion portion third smallest in height (i.e., protrusion portion 11). From a still different point of view, it is preferable that between the protrusion portion largest in height and the protrusion portion smallest in height there be disposed an (n−1) protrusion portion/protrusion portions (when 2n protrusion portions belong to the set, where n is an integer equal to or greater than 2), or n or (n−1) protrusion portions/protrusion portion (when (2n+1) protrusion portions belong to the set).

Figure 6:
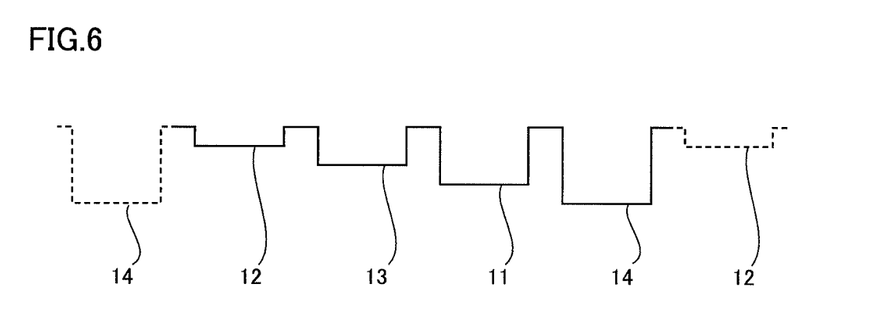
FIG. 6 illustrates a manner of arranging a protrusion portion of an outer cylindrical member of an air spring in a comparative example.

Hereinafter, an effect of the air spring in the first embodiment will be described as compared with a comparative example. An arrangement of protrusion portions 11-14 of an air spring in the comparative example is schematically shown in FIG. 6. As shown in FIG. 6, protrusion portions 11-14 of the air spring in the comparative example are arranged in an order as follows: protrusion portion 12 followed by protrusion portion 13 followed by protrusion portion 11 followed by protrusion portion 14. Protrusion portion 12 is disposed adjacent to protrusion portion 14 belonging to an adjacent set. Protrusion portion 14 is disposed adjacent to protrusion portion 12 belonging to another adjacent set. More specifically, the air spring in the comparative example has a portion at which the protrusion portion largest in height (protrusion portion 14) is adjacent to the protrusion portion smallest in height (protrusion portion 12).

Figure 7:
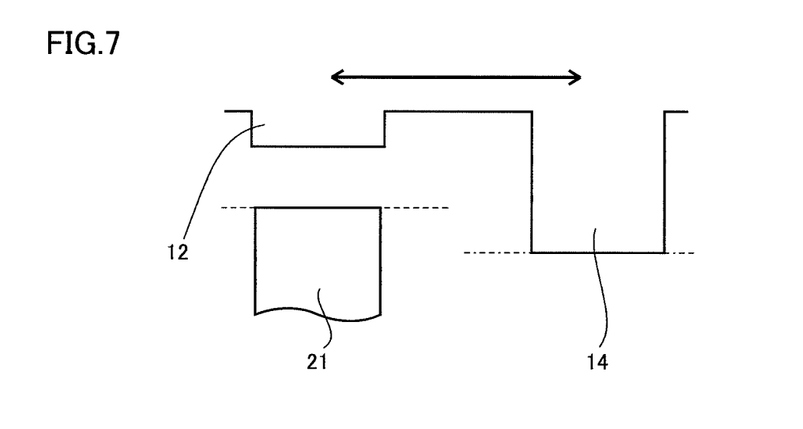
FIG. 7 illustrates in the air spring of the comparative example a positional relationship of the protrusion portion and a stopper portion in a state where the outer cylindrical member approaches an inner cylindrical member.
Figure 8:
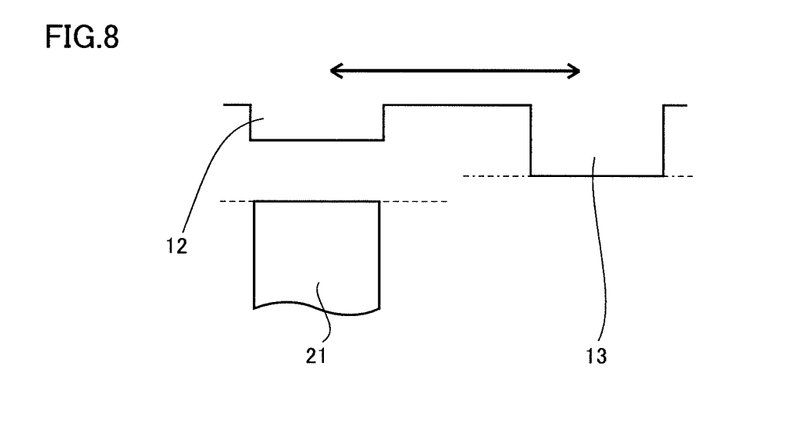
FIG. 8 illustrates in the air spring of the first embodiment of the present invention a positional relationship of the protrusion portion and a stopper portion in a state where the outer cylindrical member approaches the inner cylindrical member.

FIG. 7 schematically illustrates in the air spring of the comparative example a positional relationship of protrusion portions 11-14 and stopper portion 21 in a state where outer cylindrical member 1 approaches inner cylindrical member 9. FIG. 8 schematically illustrates in the air spring of the first embodiment a positional relationship of protrusion portions 11-14 and stopper portion 21 in a state where outer cylindrical member 1 approaches inner cylindrical member 9.

Note that FIG. 7 and FIG. 8 show a state where stopper assembly 2 is positioned such that stopper portion 21 faces protrusion portion 12.

As has been previously discussed, in the air spring in the comparative example, the protrusion portion smallest in height (protrusion portion 12) is adjacent to the protrusion portion largest in height (protrusion portion 14). Accordingly, as shown in FIG. 7, when outer cylindrical member 1 moves toward the inner cylindrical member 9 to a position at which stopper portion 21 and protrusion portion 12 are close to each other to a considerable extent, the position of the lower surface of protrusion portion 14 (indicated in the figure by an alternate long and short dash line) is lower than the position of the upper surface of the stopper portion (indicated in the figure by a dotted line). In this state when a vibration is received which causes outer cylindrical member 1 to horizontally move or rotate relative to inner cylindrical member 9 (in a direction as indicated in the figure by an arrow), a side surface of stopper portion 21 and a side surface of protrusion portion 12 may collide with each other. Such a collision may damage the air spring. Furthermore, such a collision increases discomfort of a passenger riding a vehicle having the air spring attached thereto.

In contrast, the air spring in the first embodiment has the protrusion portion smallest in height i.e., protrusion portion 12 adjacent to protrusion portions other than the protrusion portion largest in height i.e., protrusion portions 11 and 13, and accordingly, as shown in FIG. 8, unless outer cylindrical member 1 moves close to inner cylindrical member 9, protrusion portion 11 and protrusion portion 13 do not have their lower surfaces positionally lower than the upper surface of stopper portion 21. Accordingly, even when the air spring in the first embodiment, receives a vibration which causes outer cylindrical member 1 to horizontally move or rotate relative to inner cylindrical member 9, the side surface of protrusion portions 11-14 and the side surface of stopper portion 21 do not easily collide with each other. Accordingly, the air spring in the first embodiment can be resistant to damage and can also alleviate discomfort of a passenger riding a vehicle having an air spring attached thereto.

The air spring of the first embodiment having the protrusion portion smallest in height (i.e., protrusion portion 12) disposed between the protrusion portion second smallest in height (i.e., protrusion portion 13) and the protrusion portion third smallest in height (i.e., protrusion portion 11) allows protrusion portions belonging to a set to have a protrusion portion smallest in height having a minimal difference in height from the protrusion portions adjacent thereto, and can further suppress collision and hence damage of the side surface of stopper portion 21 and those of protrusion portions 11-14.

In the air spring according to the first embodiment, when between the protrusion portion smallest in height and the protrusion portion largest in height there is/are disposed an (n−1) protrusion portion/protrusion portions (when 2n protrusion portions belong to the set, where n is an integer equal to or greater than 2) or n or (n−1) protrusion portions/protrusion portion (when (2n+1) protrusion portions belong to the set), then, of the protrusion portions belonging to the set, the protrusion portion smallest in height and the protrusion portion largest in height have a maximal spacing therebetween, which can further suppress collision and hence damage of the side surface of the stopper portion and those of the protrusion portions.

The air spring in the first embodiment having a number of sets of protrusion portions 11-14 equal to that of stopper portions 21 allows movement of outer cylindrical member 1 toward inner cylindrical member 9 to be suppressed at a plurality of locations. This more reliably suppresses movement of outer cylindrical member 1 toward inner cylindrical member 9. When there is a plurality of sets of protrusion portions 11-14, the number of protrusion portions increases. This results in a reduced spacing between the protrusion portions. In other words, when a vibration is received which causes outer cylindrical member 1 to horizontally move or rotate relative to inner cylindrical member 9, the side surface of protrusion portions 11-14 and the side surface of stopper portion 21 easily collide with each other.

However, the air spring in the first embodiment does not have a portion at which the protrusion portion largest in height (protrusion portion 14) is adjacent to the protrusion portion smallest in height (protrusion portion 12), and, in such a case as described above, can suppress collision of the side surface of protrusion portions 11-14 and the side surface of stopper portion 21. This more reliably suppresses movement of outer cylindrical member 1 toward inner cylindrical member 9, and can also suppress damage to the air spring and alleviate discomfort of a passenger riding a vehicle having an air spring attached thereto.

Second Embodiment

Figure 9:
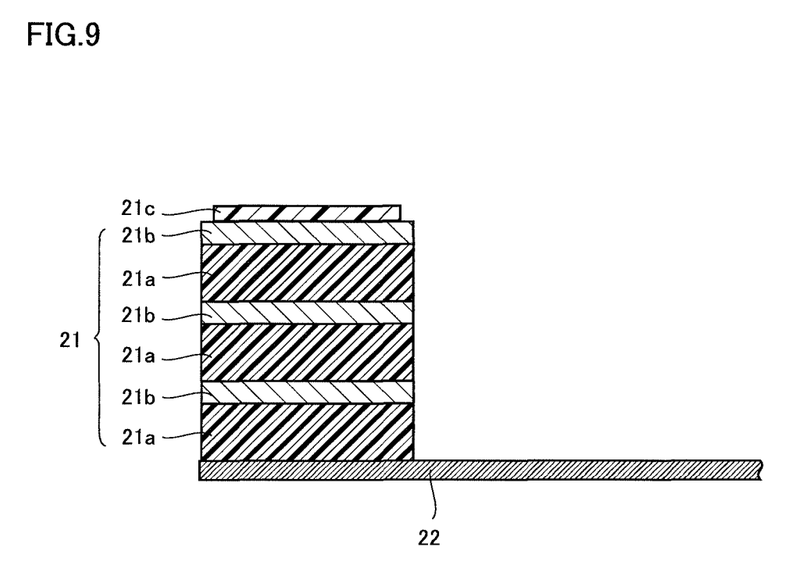
FIG. 9 is a partial cross section of an air spring in a second embodiment of the present invention.

A structure of stopper portion 21 of an air spring in a second embodiment is shown in FIG. 9. As shown in FIG. 9, stopper portion 21 has a laminated rubber structure. More specifically, stopper portion 21 has a rubber layer 21a and a metal layer 21b. Rubber layer 21a and metal layer 21b are disposed alternately in a direction from a bottom surface of the stopper portion toward an upper surface of the stopper portion. On the side of the upper surface of stopper portion 21, metal layer 21b is disposed. Stopper portion 21 having such a structure is more rigid against compressive deformation than stopper portion 21 composed of rubber layer 21a alone.

Furthermore, an antifriction material 21c may be provided on stopper portion 21 (more specifically, on metal layer 21b disposed on the side of the upper surface of stopper portion 21). Antifriction material 21c is a material such that a coefficient of friction of the material and protrusion portions 11-14 becomes smaller than a coefficient of friction of protrusion portions 11-14 and metal layer 21b. Teflon (registered trademark) is used for antifriction material 21c, for example.

Hereinafter, an effect of the air spring in the second embodiment will be described.

Stopper assembly 2 is positioned to allow stopper portion 21 to face protrusion portions 11-14. Furthermore, as the upper surface of stopper portion 21 and the lower surface of protrusion portions 11-14 collide with each other, movement of outer cylindrical member 1 toward inner cylindrical member 9 is suppressed.

When stopper portion 21 and protrusion portions 11-14 are entirely formed of metal, and the upper surface of stopper portion 21 and the upper surface of protrusion portions 11-14 collide with each other, an impact, a noise, etc. are caused due to the hardness of stopper portion 21 and protrusion portions 11-14. On the other hand, when stopper portion 21 and protrusion portions 11-14 are entirely formed of rubber, and the upper surface of stopper portion 21 and the upper surface of protrusion portions 11-14 collide with each other, stopper portion 21 and protrusion portions 11-14 significantly deform and movement of outer cylindrical member 1 toward inner cylindrical member 9 is insufficiently suppressed.

Stopper portion 21 of the air spring in the second embodiment has rubber layer 21a. As rubber layer 21a is soft, it can alleviate an impact, a noise, etc. caused when the upper surface of stopper portion 21 and the upper surface of protrusion portions 11-14 collide with each other. Furthermore, stopper portion 21 of the air spring in the second embodiment has a structure where rubber layer 21a and metal layer 21b are stacked in layers, and stopper portion 21 is thus more rigid against compressive deformation than stopper portion 21 composed of rubber layer 21a alone. Accordingly, the air spring in the second embodiment can sufficiently suppress movement of outer cylindrical member 1 toward inner cylindrical member 9. Thus the air spring in the second embodiment can coestablish alleviation of noise, impact, etc, and reliable suppression of movement of outer cylindrical member 1 toward inner cylindrical member 9.

Furthermore, the air spring in the second embodiment provided with antifriction material 21c on the upper surface of stopper portion 21 allows smooth sliding between the upper surface of stopper portion 21 and the upper surface of protrusion portions 11-14.

Third Embodiment

Hereinafter, a configuration of the bogie according to third embodiment is described.

Figure 10:
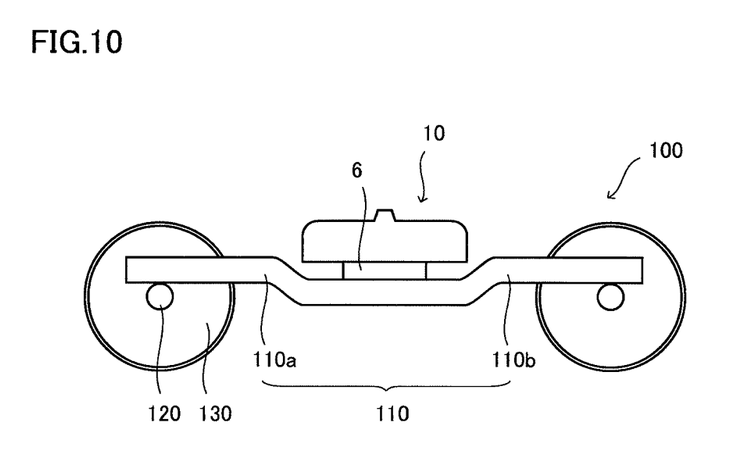
FIG. 10 is a side view of a bogie according to a third embodiment of the present invention.

A side view of a bogie 100 according to the third embodiment is shown in FIG. 10. As shown in FIG. 10, bogie 100 according to the third embodiment has air spring 10, a bogie frame 110, an axle 120, and a vehicular wheel 130. Bogie frame 110 has a lateral beam 110a and a lateral beam 110b. Vehicular wheel 130 is attached to axle 120 at the opposite ends. Axle 120 is attached to bogie frame 110. More specifically, bogie frame 110 is attached to axle 120 when lateral beam 110a and lateral beam 110b are received and thus supported by axle 120 via an axle spring (not shown). Air spring 10 is an air spring according to the first or second embodiment. Air spring 10 is attached to bogie frame 110. More specifically, air spring 10 is attached on the side of laminated rubber 6 to bogie frame 110.

An effect of the bogie according to the third embodiment will be described hereinafter.

As has been described above, bogie 100 according to the third embodiment has air spring 10 which is the air spring according to the first embodiment or the second embodiment. Bogie 100 according to the third embodiment can thus suppress damage to the air spring and alleviate discomfort of a passenger riding a vehicle mounted to the bogie.

Thus while embodiments of the present invention have been described, it is also initially planned to combine a feature of each embodiment with another as appropriate. It should also be understood that the embodiments disclosed herein have been described for the purpose of illustration only and in a non-restrictive manner in any respect. The scope of the present invention is defined by the terms of the claims, and is intended to include any modifications within the meaning and scope equivalent to the terms of the claims.

REFERENCE SIGNS LIST

1: outer cylindrical member; 2: stopper assembly; 4: diaphragm; 5: lever; 6: laminated rubber; 7: handle; 8: bottom plate; 9: inner cylindrical member; 10: air spring; 11, 12, 13, 14: protrusion portion; 16: ring-shaped projection portion; 17: coupling portion; 18: flange; 21: stopper portion; 21a: rubber layer; 21b: metal layer; 21c: antifriction material; 22: base portion; 23: ring portion; 25: screw; 26: rubber sheet; 27: internal space; 28: bolt; 33: screw hole; 100: bogie; 110: bogie frame; 110a, 110b: lateral beam; 130: vehicular wheel; 120: axle; H1, H2, H3, H4: height.

The invention claimed is:

1. An air spring comprising:
   an outer cylindrical member;
   an inner cylindrical member combined with the outer cylindrical member;
   a diaphragm which couples the outer cylindrical member and the inner cylindrical member and forms an internal space between the outer cylindrical member and the inner cylindrical member;
   a stopper assembly disposed in the internal space to be pivotable on the inner cylindrical member and capable of preventing the outer cylindrical member from moving toward the inner cylindrical member more than necessary; and
   a pivoting mechanism causing the stopper assembly to pivot on the inner cylindrical member,
   the stopper assembly having a stopper portion protruding towards the outer cylindrical member,
   the outer cylindrical member having as a set four or more protrusion portions provided at a position to face the stopper portion and protruding toward the inner cylindrical member,
   each of the protrusion portions belonging to the set being disposed successively and also different in height,
   each of the protrusion portions belonging to the set being arranged without having a protrusion portion smallest in height belonging to the set adjacent to a protrusion portion largest in height belonging to the set,
   wherein each of the protrusion portions belonging to the set is arranged such that the protrusion portion smallest in height belonging to the set is disposed between a protrusion portion second smallest in height belonging to the set and a protrusion portion third smallest in height belonging to the set in a circumferential direction.

2. The air spring according to claim 1, wherein each of the protrusion portions belonging to the set has disposed between the protrusion portion smallest in height of the set and the protrusion portion largest in height of the set an (n−1) protrusion portion/protrusion portions when 2n protrusion portions belong to the set, where n is an integer equal to or greater than 2, and n or (n−1) protrusion portions/protrusion portion belonging to the set when (2n+1) protrusion portions belong to the set, where n is an integer equal to or greater than 2.

3. The air spring according to claim 1, wherein:
   the stopper assembly includes a plurality of stopper portions; and
   the outer cylindrical member includes a set of protrusion portions for each of the plurality of stopper portions.

4. The air spring according to claim 1, wherein:
   the stopper portion has a rubber layer and a metal layer; and
   the rubber layer and the metal layer are stacked alternately.

5. The air spring according to claim 1, wherein an antifriction material is provided on an upper surface of the stopper portion.

6. A bogie comprising the air spring according to claim 1.

* * * * *